United States Patent
Haslinger et al.

(10) Patent No.: US 12,451,929 B2
(45) Date of Patent: Oct. 21, 2025

(54) NFC DEVICE AND METHOD OF OPERATING AN NFC DEVICE

(71) Applicant: NXP B.V., Eindhoven (NL)

(72) Inventors: Dorian Haslinger, Nestelbach bei Graz (AT); Wolfgang Eber, Graz (AT)

(73) Assignee: NXP B.V., Eindhoven (NL)

( * ) Notice: Subject to any disclaimer, the term of this patent is extended or adjusted under 35 U.S.C. 154(b) by 402 days.

(21) Appl. No.: 18/065,113

(22) Filed: Dec. 13, 2022

(65) Prior Publication Data

US 2023/0216543 A1 Jul. 6, 2023

(30) Foreign Application Priority Data

Jan. 3, 2022 (EP) .................................. 22150087

(51) Int. Cl.
  *H04B 5/79* (2024.01)
  *H02J 7/00* (2006.01)
  *H02J 50/20* (2016.01)

(52) U.S. Cl.
  CPC ............ *H04B 5/79* (2024.01); *H02J 7/00712* (2020.01); *H02J 50/20* (2016.02)

(58) Field of Classification Search
  CPC ......... H04B 5/79; H04B 5/24; H02J 7/00712; H02J 50/20; H02J 7/02; H02J 50/12; H02J 50/60; H02J 2207/20
  See application file for complete search history.

(56) References Cited

U.S. PATENT DOCUMENTS

| 10,819,394 B1 | 10/2020 | Petzel et al. | |
| 2011/0221388 A1 | 9/2011 | Low et al. | |
| 2015/0145471 A1 | 5/2015 | Huijser | |
| 2017/0331317 A1* | 11/2017 | Wheeland | H04B 5/79 |
| 2020/0380326 A1* | 12/2020 | Kawaguchi | H04B 1/401 |
| 2021/0374365 A1* | 12/2021 | Patricio | H04B 5/77 |
| 2022/0271798 A1* | 8/2022 | Wobak | H04B 5/73 |
| 2023/0216543 A1* | 7/2023 | Haslinger | H02J 7/00712 455/41.1 |

FOREIGN PATENT DOCUMENTS

| EP | 3447875 A1 | 2/2019 |
| WO | 2021102725 A1 | 6/2021 |

* cited by examiner

Primary Examiner — Md K Talukder (57) ABSTRACT

In accordance with a first aspect of the present disclosure, a near field communication (NFC) device is provided, comprising: an antenna configured to enable wireless communication with an external device; a charging unit configured to charge the external device by transferring power to said external device through said antenna; a detection unit configured to detect whether the external device is a passive NFC device; a controller configured to control the charging unit in dependence on an output of the detection unit, wherein said output indicates whether the external device is a passive NFC device. In accordance with a second aspect of the present disclosure, a corresponding method of operating a near field communication (NFC) device is conceived.

18 Claims, 11 Drawing Sheets

NFC DEVICE AND METHOD OF OPERATING AN NFC DEVICE

CROSS-REFERENCE TO RELATED APPLICATIONS

This application claims the priority under 35 U.S.C. § 119 of European Patent application no. 22150087.9, filed on 3 Jan. 2022, the contents of which are incorporated by reference herein.

TECHNICAL FIELD

The present disclosure relates to a near field communication (NFC) device. Furthermore, the present disclosure relates to a corresponding method of operating an NFC device.

BACKGROUND

Near field communication (NFC) is an established technology for proximity communication for various use cases. Using this technology, a primary device may generate a radio frequency (RF) field at a frequency of 13.56 MHz to power a secondary device. Modulation techniques are used to communicate in both directions. The secondary device may be a passive device (e.g., a tag or a transponder) or an active, typically battery-powered device. An RF field generated by an NFC reader can be used to charge the battery of the secondary device. This process is referred to as wireless charging. Some wireless charging devices may use low frequency (LF) transmitters to charge the battery of the secondary device; an example of such a device is the so-called Qi-charger. Qi is an open interface standard that defines wireless power transfer using inductive charging over distances of up to 4 cm; this standard has been developed by the Wireless Power Consortium.

SUMMARY

In accordance with a first aspect of the present disclosure, a near field communication (NFC) device is provided, comprising: an antenna configured to enable wireless communication with an external device; a charging unit configured to charge the external device by transferring power to said external device through said antenna; a detection unit configured to detect whether the external device is a passive NFC device; a controller configured to control the charging unit in dependence on an output of the detection unit, wherein said output indicates whether the external device is a passive NFC device.

In one or more embodiments, the controller is further configured to prevent the charging unit from charging the external device if the detection unit has detected that the external device is a passive NFC device, or to reduce the amount of power transferred by the charging unit if the detection unit has detected that the external device is a passive NFC device.

In one or more embodiments, the controller is further configured to permit the charging unit to charge the external device if the detection unit has detected that the external device is not a passive NFC device.

In one or more embodiments, the detection unit is configured to determine whether or not a relationship between a resonant frequency of the external device and a field strength of the NFC device can be approximated as a linear relationship, and to conclude that the external device is a passive NFC device if said relationship cannot be approximated as a linear relationship.

In one or more embodiments, the detection unit is further configured to conclude that the external device is not a passive NFC device if said relationship can be approximated as a linear relationship.

In one or more embodiments, the detection unit is configured to measure a complex load on the NFC device at different strengths of the field generated by the NFC device, and to conclude that the relationship between the resonant frequency of the external device and the field strength of the NFC device can be approximated as a linear relationship if a relationship between said complex load and said field strength can be approximated as a linear relationship.

In one or more embodiments, the complex load includes a magnitude component and a phase component.

In one or more embodiments, the detection unit is configured to carry out network analysis or to use network analysis results provided by a network analyzer to determine whether or not the relationship between the resonant frequency of the external device and the field strength of the NFC device can be approximated as a linear relationship.

In one or more embodiments, the charging unit comprises a low frequency (LF) transmitter configured to transfer power to the external device.

In accordance with a second aspect of the present disclosure, a method of operating a near field communication (NFC) device is conceived, comprising: detecting, by a detection unit included in the NFC device, whether an external device is a passive NFC device; charging, by a charging unit included in the NFC device, the external device by transferring power to said external device through an antenna included in the NFC device; controlling, by a controller included in the NFC device, the charging unit in dependence on an output of the detection unit, wherein said output indicates whether the external device is a passive NFC device.

In one or more embodiments, the controller prevents the charging unit from charging the external device if the detection unit has detected that the external device is a passive NFC device, or reduces the amount of power transferred by the charging unit if the detection unit has detected that the external device is a passive NFC device.

In one or more embodiments, the controller permits the charging unit to charge the external device if the detection unit has detected that the external device is not a passive NFC device.

In one or more embodiments, the detection unit determines whether or not a relationship between a resonant frequency of the external device and a field strength of the NFC device can be approximated as a linear relationship and concludes that the external device is a passive NFC device if said relationship cannot be approximated as a linear relationship.

In one or more embodiments, the detection unit concludes that the external device is not a passive NFC device if said relationship can be approximated as a linear relationship.

In one or more embodiments, the detection unit measures a complex load on the NFC device at different strengths of the field generated by the NFC device, and concludes that the relationship between the resonant frequency of the external device and the field strength of the NFC device can be approximated as a linear relationship if a relationship between said complex load and said field strength can be approximated as a linear relationship.

DESCRIPTION OF DRAWINGS

Embodiments will be described in more detail with reference to the appended drawings, in which.

DESCRIPTION OF EMBODIMENTS

As mentioned above, near field communication (NFC) is an established technology for proximity communication for various use cases. Using this technology, a primary device may generate a radio frequency (RF) field at a frequency of 13.56 MHz to power a secondary device. Modulation techniques are used to communicate in both directions. The secondary device may be a passive device (e.g., a tag or a transponder) or an active, typically battery-powered device. An RF field generated by an NFC reader can be used to charge the battery of the secondary device. This process is referred to as wireless charging. Some wireless charging devices may use low frequency (LF) transmitters to charge the battery of the secondary device; an example of such a device is the so-called Qi-charger. Qi is an open interface standard that defines wireless power transfer using inductive charging over distances of up to 4 cm; this standard has been developed by the Wireless Power Consortium.

Figure 1:
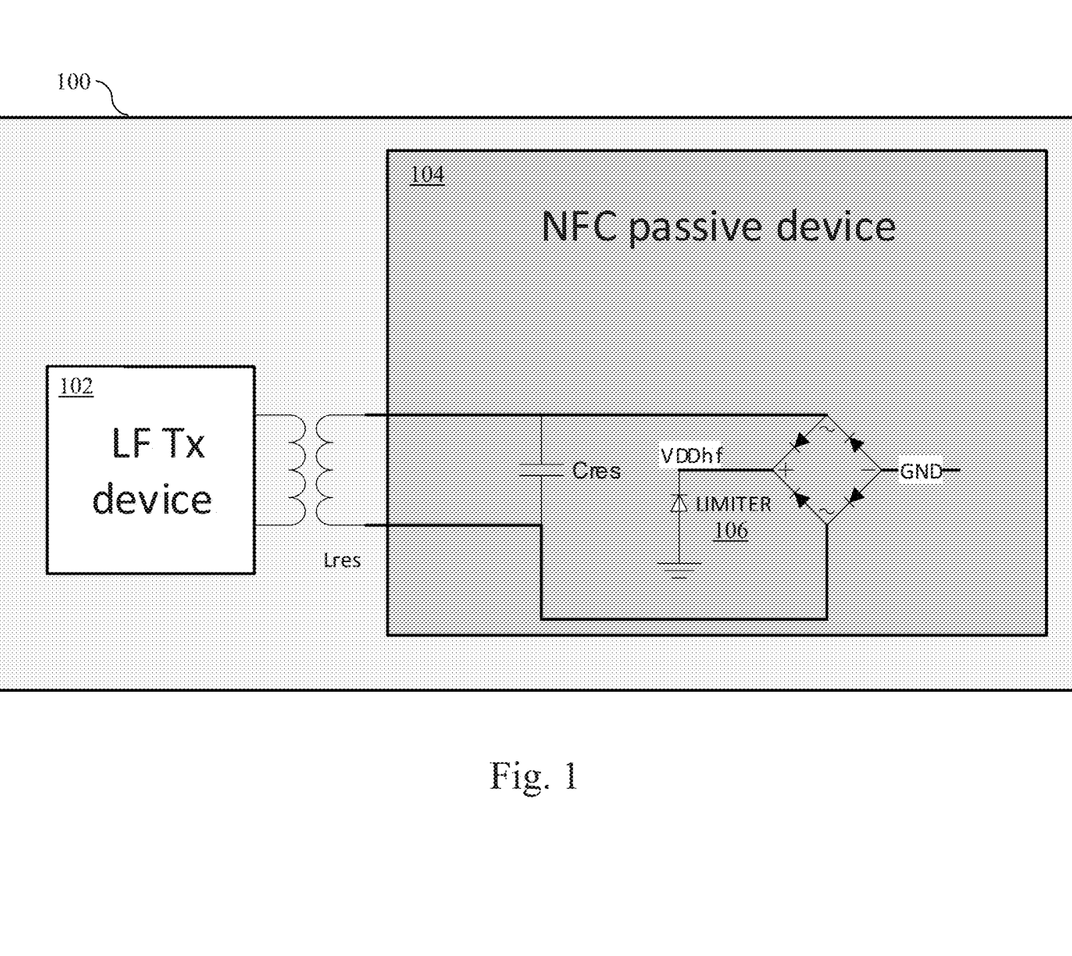
FIG. 1 shows an example of a charging system.

FIG. 1 shows an example of a charging system 100. The system 100 comprises a low frequency (LF) transmitter device 102, such as a Qi charger, and a passive NFC device 104 that is inductively coupled to the LF transmitter device 102. The passive NFC device 104 may be a smart card, for example, which has unintentionally been brought into proximity of the LF transmitter device 102. More specifically, the LF transmitter device 102 is typically used for charging the battery of active NFC devices, such as mobile phones. As used herein, the term "passive device" refers to a device which does not have a battery but is powered by the field. It is noted that a passive device may contain one or more storage elements for temporary storing energy extracted from the field. In contrast, the term "active device" refers to a device which has an internal power source, such as a battery. The skilled person will appreciate that the LF transmitter device 102 typically operates in a frequency range in the order of tens to hundreds of kHz, while the passive NFC device 104 typically operates at a frequency of 13.56 MHz. However, if the induced voltage becomes higher than the limiter voltage, the limiter 106 of the passive NFC device 104 will become active and shortcut the NFC coil. As a result, some hundreds of milliamperes up to several amperes of current may be injected into the passive NFC device 104. This, in turn, may damage the passive NFC device 104 very quickly.

Now discussed are an NFC device and a corresponding method of operating an NFC device, which facilitate avoiding damage of an external device, for instance of an external device which has unintentionally been brought into proximity of the NFC device.

Figure 2:
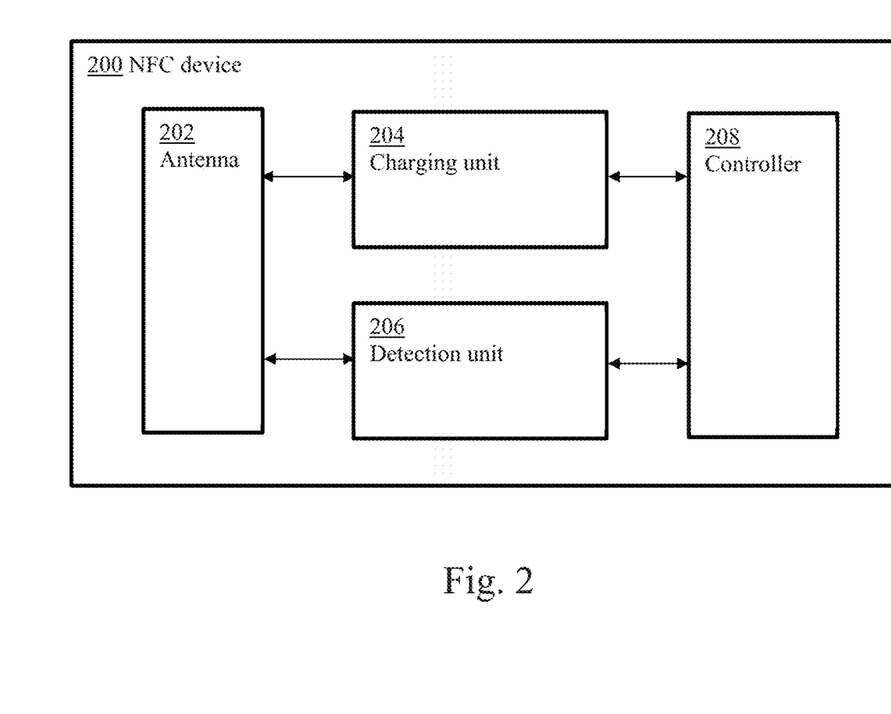
FIG. 2 shows an illustrative embodiment of an NFC device.

FIG. 2 shows an illustrative embodiment of an NFC device 200. The NFC device 200 comprises an antenna 202, a charging unit 204, a detection unit 206 and a controller 208. It is noted that, although the components 202, 204, 206, 208 have been shown as separate components, some of these components may be integrated into a single unit or device. For instance, the detection unit 206 and the controller 208 may form a single unit, and the detection unit 206 and/or controller 208 may be embedded in the charging unit 204. The antenna 202 is configured to enable wireless communication with an external device (not shown). Furthermore, the charging unit 204 is configured to charge the external device by transferring power to said external device through the antenna 202. Furthermore, the detection unit 206 is configured to detect whether the external device is a passive NFC device. Finally, the controller 208 is configured to control the charging unit 204 in dependence on an output of the detection unit 206, wherein said output indicates whether the external device is a passive NFC device. In this way, since the charging unit 204 is controlled by taking into account whether the external device is a passive NFC device, damage to the external device may be avoided. As mentioned above, a passive NFC device may be damaged relatively quickly when it is exposed to a charging unit which is not intended for charging such a passive device.

In one or more embodiments, the controller is further configured to prevent the charging unit from charging the external device if the detection unit has detected that the external device is a passive NFC device, or to reduce the amount of power transferred by the charging unit if the detection unit has detected that the external device is a passive NFC device. This further facilitates avoiding damage to the external device, because it may be ensured that no excessive amount of power is transferred to a passive NFC device. In one or more embodiments, the controller is further configured to permit the charging unit to charge the external device if the detection unit has detected that the external device is not a passive NFC device. In this way, the charging process may start relatively quickly, after it has been verified that the external device will most likely not become damaged.

In one or more embodiments, the detection unit is configured to determine whether or not a relationship between a resonant frequency of the external device and a field strength of the NFC device can be approximated as a linear relationship, and to conclude that the external device is a passive NFC device if said relationship cannot be approximated as a linear relationship. In particular, a non-linear relationship between the resonant frequency and the field strength provides a suitable indication of the passive nature of the external device. In one or more embodiments, the detection unit is further configured to conclude that the external device is not a passive NFC device if said relationship can be approximated as a linear relationship. In particular, an approximately linear relationship between the resonant frequency and the field strength provides a suitable indication of the active nature of the external device. In one or more embodiments, the detection unit is configured to measure a complex load on the NFC device at different strengths of the field generated by the NFC device, and to conclude that the relationship between the resonant frequency of the external device and the field strength of the NFC device can be approximated as a linear relationship if a relationship between said complex load and said field strength can be approximated as a linear relationship. In particular, changes in the complex load on the NFC device may accurately reflect changes in the resonant frequency of the external device, so that the former may be used as reliable indication of the latter. Furthermore, the complex load on the NFC device may be measured relatively easy. The skilled person will appreciate that a complex load is a load that contains a magnitude component and a phase component. Thus, in a practical implementation, both the magnitude component and the phase component of the load on the NFC device may be measured. Alternatively, the detection unit may be configured to carry out a network analysis or to use network analysis results provided by a network analyzer to determine whether or not the relationship between the resonant frequency of the external device and the field strength of the NFC device can be approximated as a linear relationship. In that case, the resonant frequency of the external device may be measured directly, such that no load measurements need to be performed. Furthermore, in a practical implementation, the charging unit comprises an LF transmitter configured to transfer power to the external device.

Figure 3:
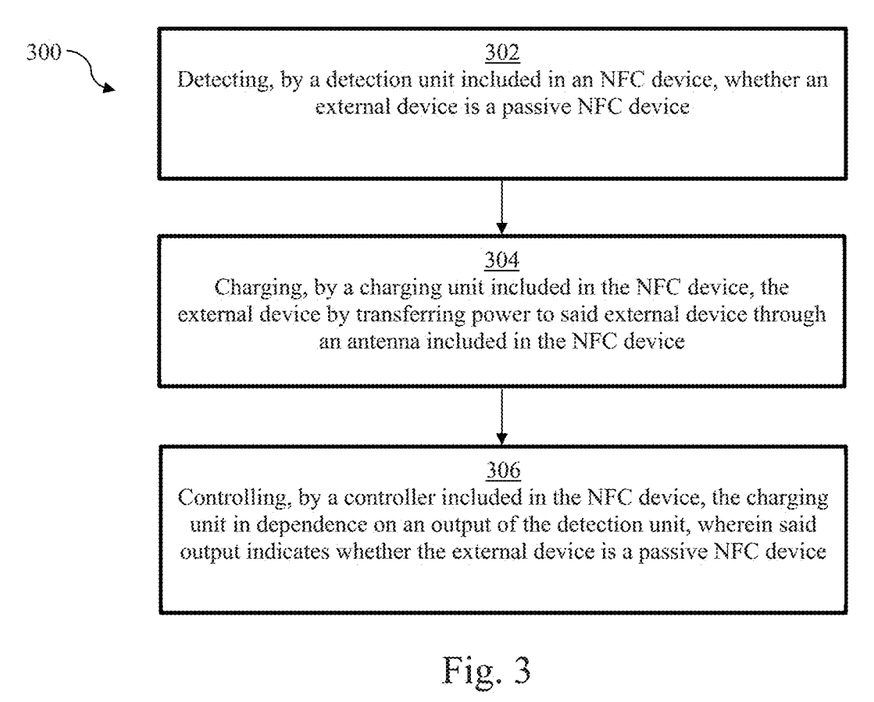
FIG. 3 shows an illustrative embodiment of a method of operating an NFC device.

FIG. 3 shows an illustrative embodiment of a method 300 of operating an NFC device. The method 300 comprises the following steps. At 302, a detection unit included in an NFC device detects whether an external device is a passive NFC device. At 304, a charging unit included in the NFC device charges the external device by transferring power to said external device through an antenna comprised the NFC device. Furthermore, at 306, a controller included in the NFC device controls the charging unit in dependence on an output of the detection unit, wherein said output indicates whether the external device is a passive NFC device. As mentioned above, since the charging unit is controlled by taking into account whether the external device is a passive NFC device, damage to the external device may be avoided.

In accordance with the present disclosure, the characteristics of a contactless interface (CLIF) of a passive NFC device may be used for the purpose of determining whether a charging process should be started or continued. In particular, said characteristics may be detected by measuring the resonant frequency of said device at given output power levels (e.g., by means of a network analysis), or by measuring a derivative of said resonant frequency (e.g., a complex load on the NFC device) at the given output power levels. The NFC device may be a so-called NFC reader or interrogator, which has the additional capability of charging the external device. It is noted that a passive NFC device typically has a non-linear input (Resonance) capacitance and a non-linear load, which depends on the input voltage. This characteristic may be exploited to facilitate providing a suitable indication that the external device is a passive NFC device to the reader or interrogator. It is noted that an active NFC device, such as a mobile phone, typically has a constant load over a very wide range of input power levels.

Figure 4:
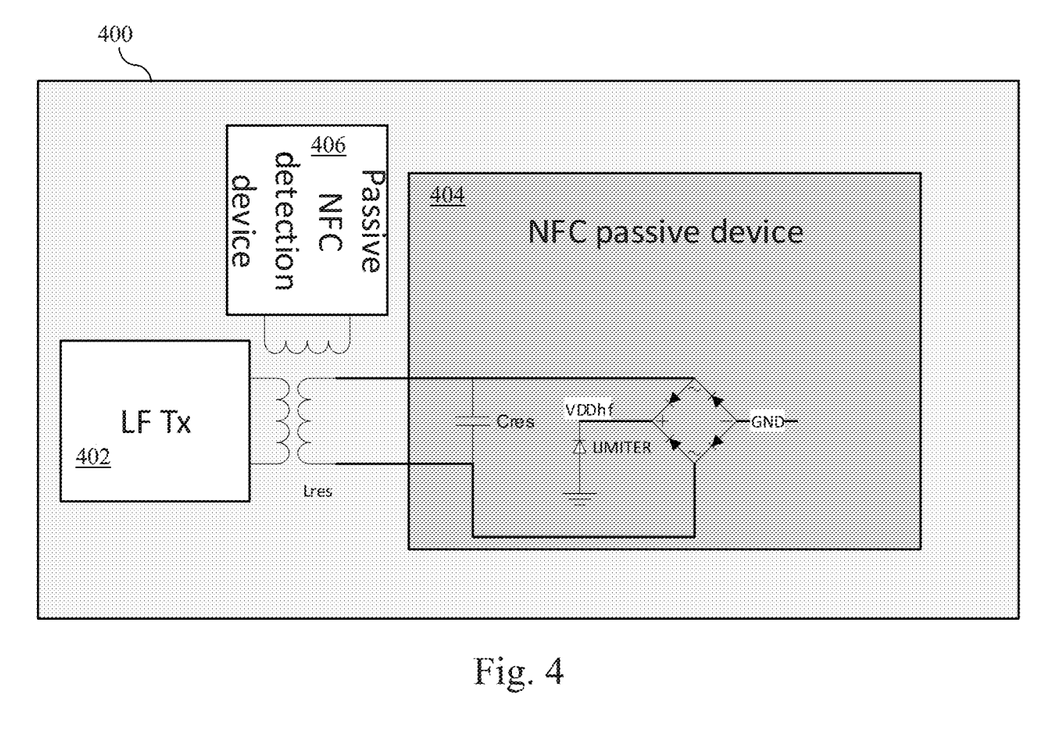
FIG. 4 shows an illustrative embodiment of a charging system.

FIG. 4 shows an illustrative embodiment of a charging system 400. The system 400 comprises an LF transmitter 402, a passive NFC device 404 and a passive NFC detection device 406. The passive NFC detection device 406 is configured to detect (and thus confirm) that the passive NFC device 404 is indeed a passive device, i.e., a device that is powered by the field. Thus, in addition to the LF driver or LF transmitter device (e.g., Qi charger) a passive NFC detection feature is used. The passive NFC detection feature can be implemented as an independent device or form part of an NFC reader or LF driver IC. Thus, the passive NFC detection device 406 may be external to the LF transmitter 402, as shown in FIG. 4. Alternatively, the passive NFC detection device 406 may be included in the LF transmitter 402 (not shown). The passive NFC detection feature may use the characteristic of a passive NFC device front-end or contactless interface (CLIF) to detect whether a passive NFC device is present and thus to distinguish between an active device, such as an NFC—enabled mobile phone, and a passive device, such as a smart card.

Figure 5A:
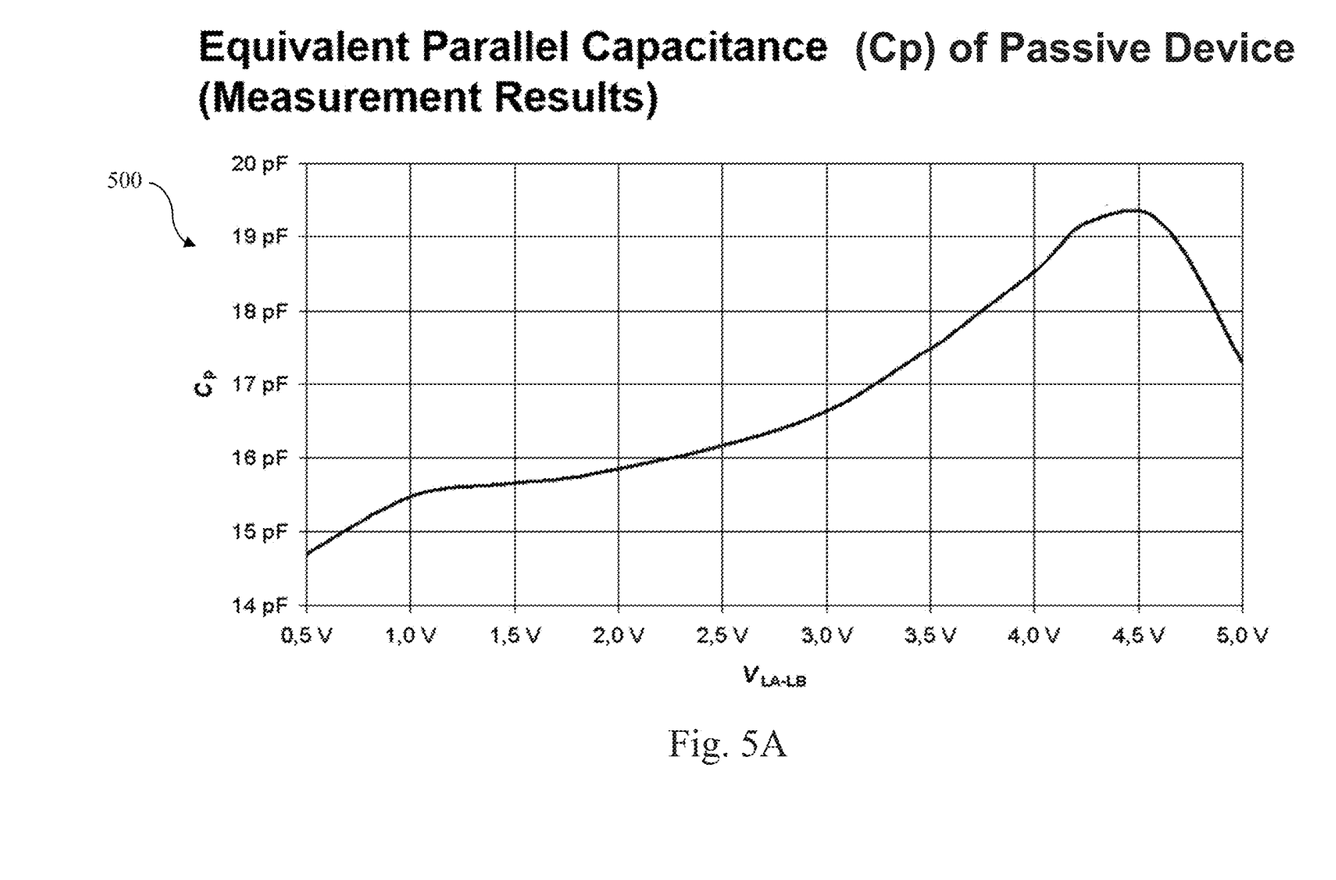
FIG. 5A shows an equivalent parallel capacitance of a passive device.
Figure 5B:
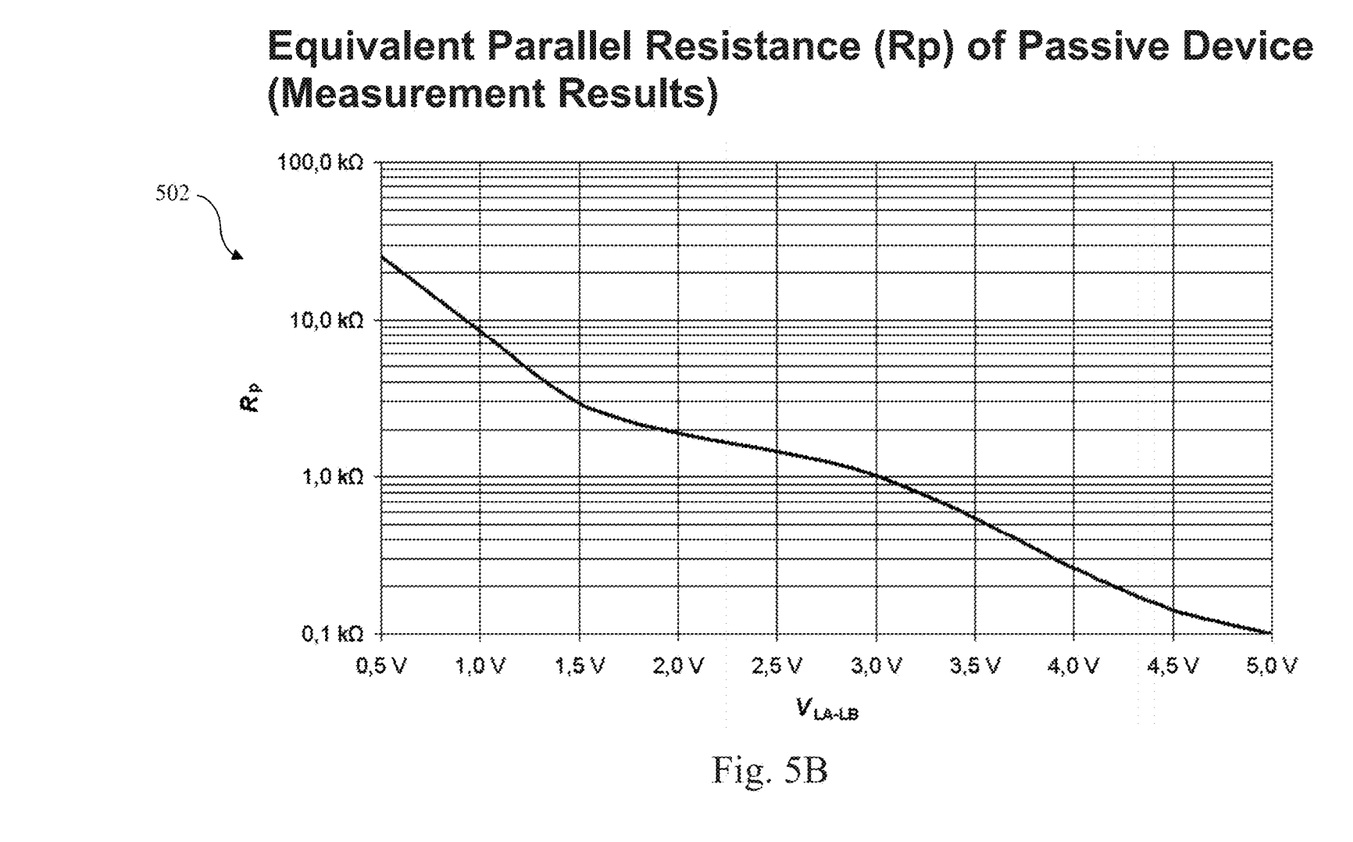
FIG. 5B shows an equivalent parallel resistance of a passive device.

FIGS. 5 and 5B show an equivalent parallel capacitance 500 and an equivalent parallel resistance 502 of a passive device. In particular, it is shown that a passive NFC device has a non-linear input or resonance capacitance (parallel capacitance) as well as a non-linear ohmic load which depends on the input or coil voltage (equivalent parallel capacitance). This has the effect that the resonant frequency of the passive device depends on the used field strength (Pout). The reader may exploit this behavior to detect that it is coupled to a passive device. As mentioned above, this detection may be implemented in various ways. For instance, the reader may determine whether or not a complex load (i.e., a load that includes a magnitude and phase component) on its internal components (e.g., on an integrated circuit and antenna) has a non-linear relationship with its output power (i.e., with the strength of the generated field). In particular, a parallel capacitance ($C_c$) and parallel resistance ($R_c$) of an integrated circuit (i.e., a chip) coupled to the antenna may be measured. Assuming that the capacitance, resistance and inductance of the antenna remain substantially constant, changes in the resonant frequency of the external device may be derived from changes in said parallel capacitance ($C_c$) and parallel resistance ($R_c$), as shown in FIG. 7.

Figure 6:
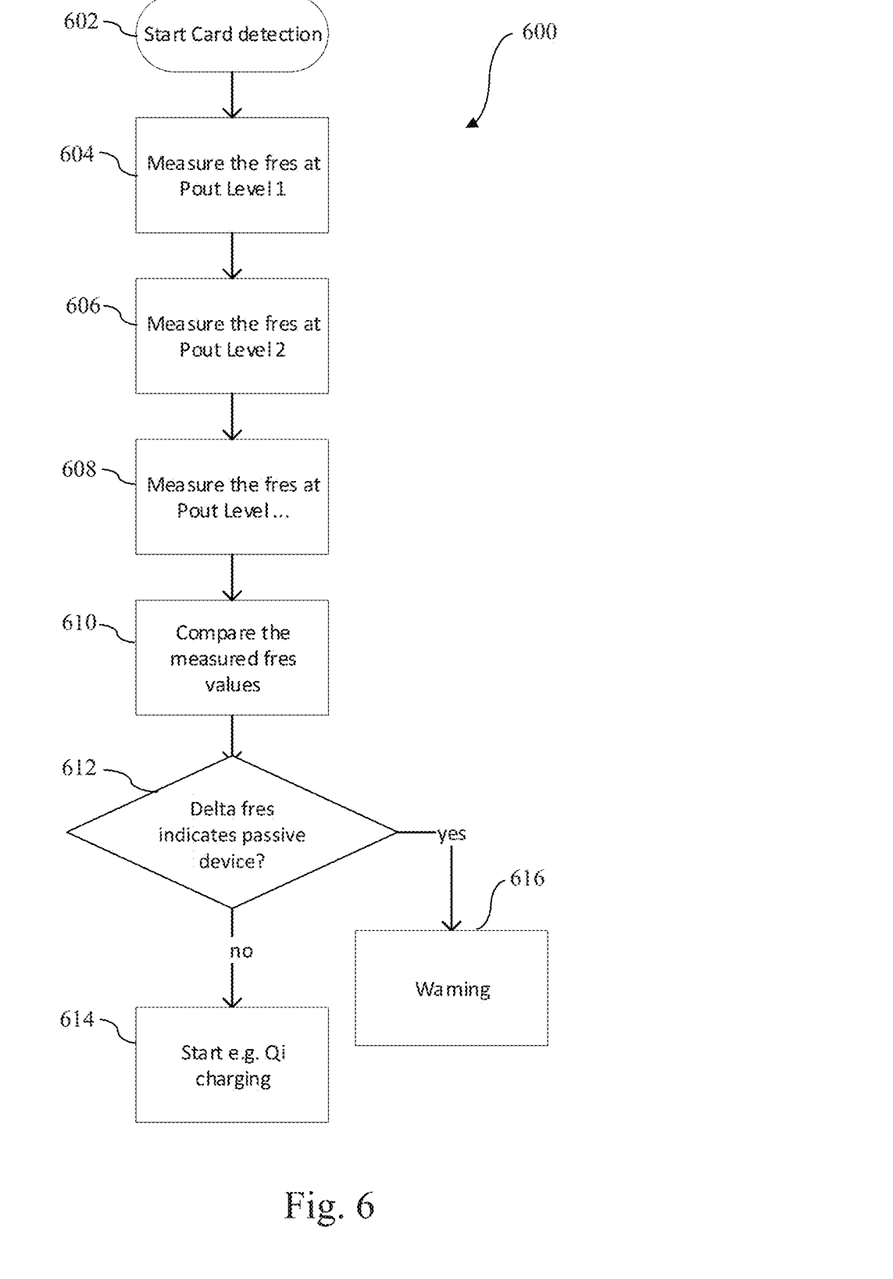
FIG. 6 shows an illustrative embodiment of a method of operating an NFC device.

FIG. 6 shows an illustrative embodiment of a method 600 of operating an NFC device. The method 600 comprises the following steps. At 602, a card detection process is started. At 604, the resonant frequency of an external device is measured at a first output power level. At 604, the resonant frequency is measured at a second output power level. At 608, the resonant frequency is measured at a further output power level. This measurement may be repeated for more output power levels. Then, at 610, the measured resonant frequency values are compared with each other, and at 612, it is determined whether the differences between the measured resonance frequencies lie on a non-linear or on an approximately linear curve. If they lie on a non-linear curve, then the differences between the measured resonance frequencies indicate that the NFC device is inductively coupled to a passive NFC device (i.e., that the external device is a passive NFC device). In that case, a warning 616 may be raised. Otherwise, a charging process may be started 614 (e.g., Qi charging).

Accordingly, before an LF transmitter device starts operating an NFC detection flow may be used to detect the presence of an external NFC device and to distinguish between an active device and a passive device. For this purpose, the resonant frequency of the external NFC device may be measured at different output power levels of the transmitting NFC device. The number of different output levels used for this measurement may be configurable. After the measurements have been carried out the results may be analyzed; the outcome of this analysis may indicate that the passive device has been detected or not. In particular, a dependency of the resonant frequency on the output power level indicates the presence of a passive device. More specifically, a non-linear relationship between the resonant frequency and the output power level indicates the presence of a passive device. If a passive NFC device has been detected a warning signal may indicate the presence of said device and the LF transmitter device may for example be deactivated in response to receiving the warning signal.

Figure 7:
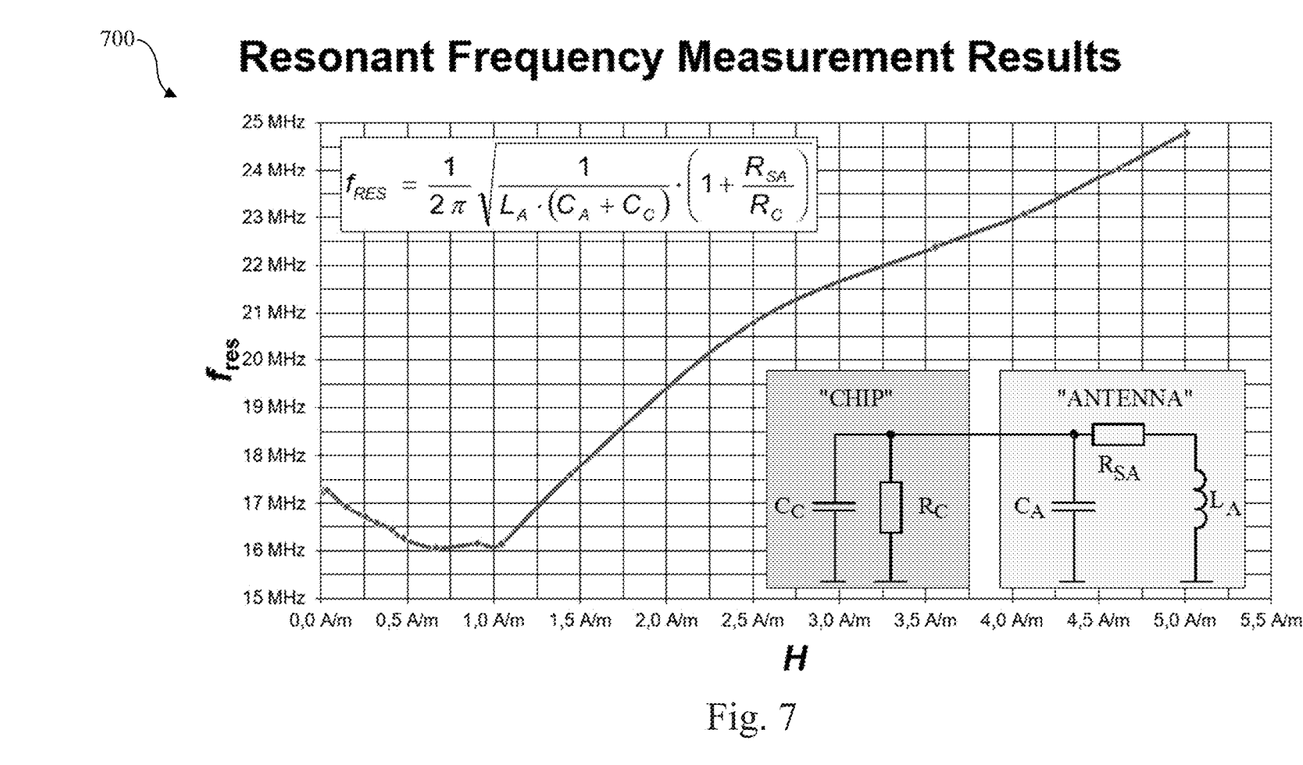
FIG. 7 shows resonant frequency measurement results.

FIG. 7 shows resonant frequency measurement results 700. In particular, it is shown that the measured resonant frequency ($f_{res}$) has a non-linear relationship with the field strength (H), or in other words with the output power level of the NFC device. As mentioned above, this is indicative of the passive nature of the external NFC device. The NFC device includes a chip and an antenna; the resonant frequency of the external device may be estimated using parameters of the chip and the antenna as shown in FIG. 7. As mentioned above, these parameters may include a parallel capacitance ($C_c$) and parallel resistance ($R_c$) of the chip coupled to the antenna. Thus, changes in the resonant frequency may effectively be derived from changes in said parallel capacitance and parallel resistance. The skilled person will appreciate that this implementation merely represents an example, and that the resonant frequency of the external device may be estimated differently in other implementations. However, since changes of the parallel capacitance and parallel resistance of the chip correlate with changes in the resonant frequency of the external device, the NFC device may in this implementation determine whether or not these parameters (which represent the complex load on the NFC device) have a non-linear relationship with the field strength. If so, then the NFC device may conclude that the external NFD device is a passive device.

Figure 8:
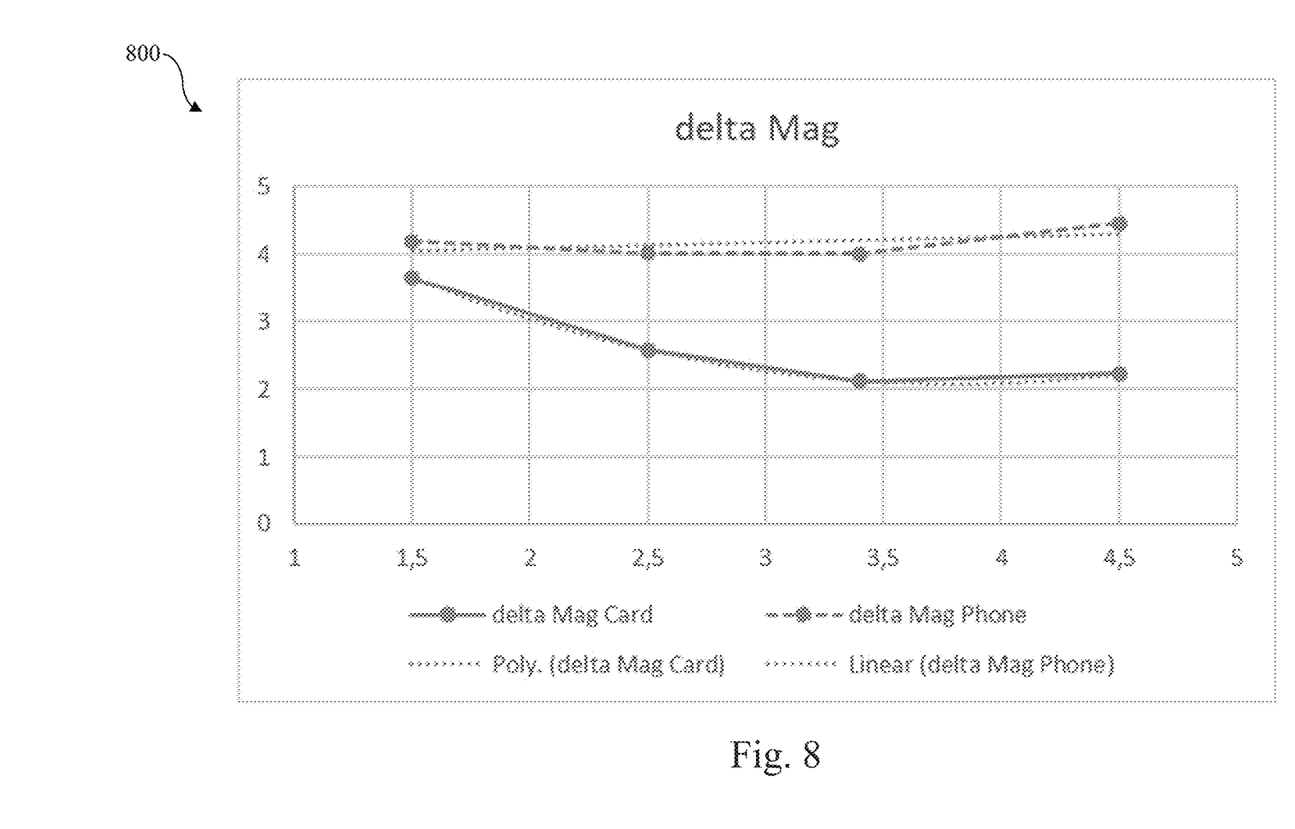
FIG. 8 shows differences in a magnitude of a complex load.
Figure 9:
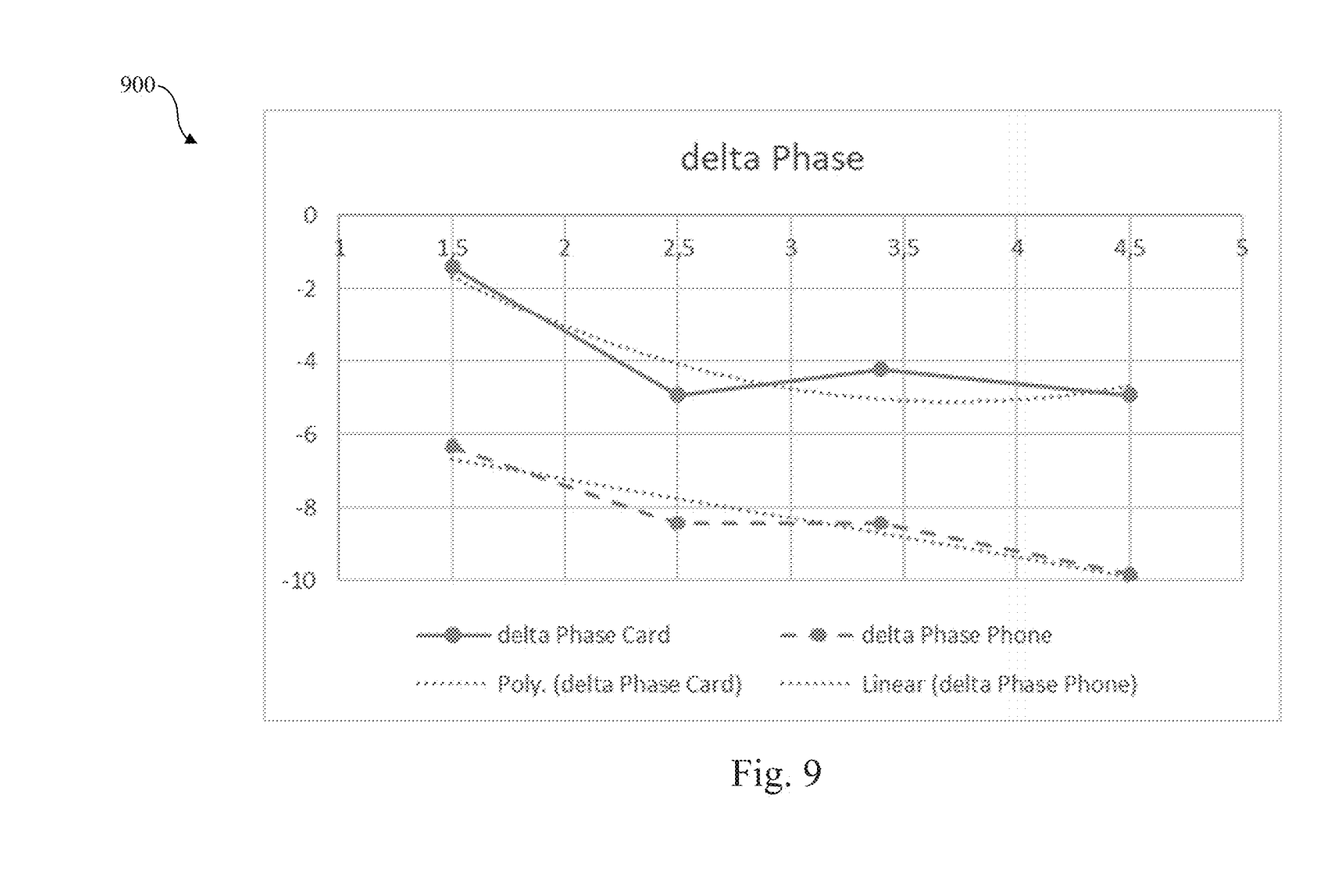
FIG. 9 shows differences in a phase of a complex load.

FIGS. 8 and 9 show differences in a magnitude of a complex load and differences in a phase of a complex load, respectively. As mentioned above, measuring a magnitude of the complex load and measuring a phase of said complex load result in practical implementations of the presently disclosed NFC device. The skilled person will appreciate that said magnitude and phase can be measured in various ways. In particular, test results are shown for a device under test, i.e., an NFC device of the kind set forth. The magnitude and the phase have been measured for two different external devices, one being smart card (i.e., a passive device) and the other being a mobile phone (i.e., an active device). The test results show that the smart card has a different relationship between the magnitude/phase of the complex load (shown on the Y-axis) and the output power level in volts (shown on the X-axis) than the mobile phone. More specifically, the relationship of the smart card cannot be approximated as a linear relationship, while the relationship of the mobile phone can be approximated as a linear relationship. In other words, the smart card has a non-linear relationship between the magnitude/phase of the complex load and the output power level. This characteristic may be used to distinguish the smart card from the mobile phone, and to protect the former by deactivating a charging unit of the NFC device.

Figure 10:
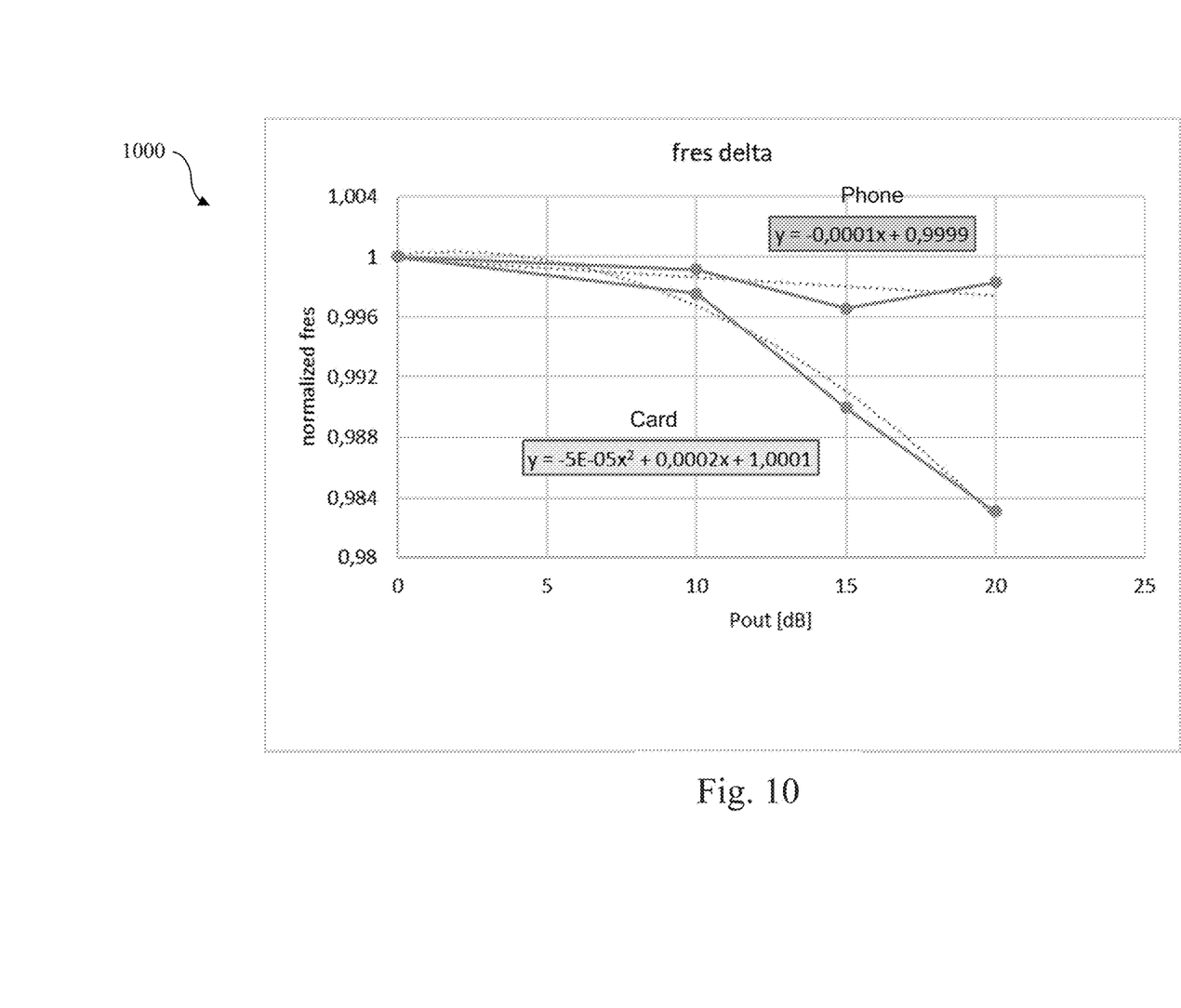
FIG. 10 shows differences in a resonant frequency of different external devices.

FIG. 10 shows differences in a resonant frequency of different external devices. As mentioned above, this resonant frequency may be measured by carrying out network analysis. In particular, test results are shown for two external devices. The relationship between the resonant frequency of an active device (i.e., a phone) and the output power of a reader can be approximated as a linear relationship, while the relationship between the resonant frequency of a passive device (i.e., a card) and the output power of the reader cannot be approximated as a linear relationship. In this way, the active device can properly be distinguished from the passive device.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 charging system
102 low frequency transmitter device
104 NFC passive device
106 limiter
200 NFC device
202 antenna
204 charging unit
206 detection unit
208 controller
300 method of operating an NFC device
302 detecting, by a detection unit included in an NFC device, whether an external device is a passive NFC device
304 charging, by a charging unit included in the NFC device, the external device by transferring power to said external device through an antenna included in the NFC device
306 controlling, by a controller included in the NFC device, the charging unit in dependence on an output of the detection unit, wherein said output indicates whether the external device is a passive NFC device
400 charging system
402 LF transmitter
404 NFC passive device
406 passive NFC detection device
500 equivalent parallel capacitance of the passive device
502 equivalent parallel resistance of the passive device
600 method of operating an NFC device
602 start card detection
604 measure the resonant frequency at a first output power level
606 measure the resonant frequency at a second output power level
608 measure the resonant frequency at a further output power level
610 compare the measured resonant frequency values
612 delta resonance frequencies indicates a passive device?
614 start for example Qi charging
616 warning
700 resonant frequency measurement results
800 delta magnitude
900 delta phase
1000 delta resonant frequency

The invention claimed is:

1. A near field communication, NFC, device, comprising:
an antenna configured to enable wireless communication with an external device;
a charging unit configured to charge the external device by transferring power to said external device through said antenna;
a detection unit configured to detect whether the external device is a passive NFC device;
a controller configured to control the charging unit in dependence on an output of the detection unit, wherein said output indicates whether the external device is a passive NFC device;
wherein the detection unit is configured to determine whether or not a relationship between a resonant frequency of the external device and a field strength of the NFC device can be approximated as a linear relationship, and to conclude that the external device is a passive NFC device if said relationship cannot be approximated as a linear relationship;
wherein the detection unit is further configured to conclude that the external device is not a passive NFC device if said relationship can be approximated as a linear relationship.

2. The NFC device of claim 1, wherein the controller is further configured to reduce the amount of power transferred by the charging unit if the detection unit has detected that the external device is a passive NFC device.

3. The NFC device of claim 2, wherein the controller is further configured to permit the charging unit to charge the external device if the detection unit has detected that the external device is not a passive NFC device.

4. The NFC device of claim 1, wherein the controller is further configured to permit the charging unit to charge the external device if the detection unit has detected that the external device is not a passive NFC device.

5. The NFC device of claim 1, wherein the charging unit comprises a low frequency, LF, transmitter configured to transfer power to the external device.

6. The NFC device of claim 1, wherein the controller is further configured to prevent the charging unit from charging the external device if the detection unit has detected that the external device is a passive NFC device.

7. The NFC device of claim 6, wherein the controller is further configured to permit the charging unit to charge the external device if the detection unit has detected that the external device is not a passive NFC device.

8. The NFC device of claim 1, wherein the detection unit is configured to measure a complex load on the NFC device at different strengths of the field generated by the NFC device, and to conclude that the relationship between the resonant frequency of the external device and the field strength of the NFC device can be approximated as a linear relationship if a relationship between said complex load and said field strength can be approximated as a linear relationship.

9. The NFC device of claim 8, wherein the complex load includes a magnitude component and a phase component.

10. The NFC device of claim 1, wherein the detection unit is configured to carry out network analysis or to use network analysis results provided by a network analyzer to determine whether or not the relationship between the resonant frequency of the external device and the field strength of the NFC device can be approximated as a linear relationship.

11. A method of operating a near field communication, NFC, device, comprising:
detecting, by a detection unit included in the NFC device, whether an external device is a passive NFC device;
charging, by a charging unit included in the NFC device, the external device by transferring power to said external device through an antenna included in the NFC device;
controlling, by a controller included in the NFC device, the charging unit in dependence on an output of the detection unit, wherein said output indicates whether the external device is a passive NFC device;
wherein the detection unit determines whether or not a relationship between a resonant frequency of the external device and a field strength of the NFC device can be approximated as a linear relationship and concludes that the external device is a passive NFC device if said relationship cannot be approximated as a linear relationship;
wherein the detection unit concludes that the external device is not a passive NFC device if said relationship can be approximated as a linear relationship.

12. The method of claim 11, wherein the controller prevents the charging unit from charging the external device if the detection unit has detected that the external device is a passive NFC device.

13. The method of claim 12, wherein the controller permits the charging unit to charge the external device if the detection unit has detected that the external device is not a passive NFC device.

14. The method of claim 11, wherein the controller permits the charging unit to charge the external device if the detection unit has detected that the external device is not a passive NFC device.

15. The method of claim 11, wherein the controller reduces the amount of power transferred by the charging unit if the detection unit has detected that the external device is a passive NFC device.

16. The method of claim 15, wherein the controller permits the charging unit to charge the external device if the detection unit has detected that the external device is not a passive NFC device.

17. The method of claim 11, wherein the detection unit carries out network analysis or uses network analysis results provided by a network analyzer to determine whether or not the relationship between the resonant frequency of the external device and the field strength of the NFC device can be approximated as a linear relationship.

18. The method of claim 11, wherein the detection unit measures a complex load on the NFC device at different strengths of the field generated by the NFC device, and concludes that the relationship between the resonant frequency of the external device and the field strength of the NFC device can be approximated as a linear relationship if a relationship between said complex load and said field strength can be approximated as a linear relationship.

\* \* \* \* \*